United States Patent [19]

Smithlin

[11] Patent Number: 5,746,811
[45] Date of Patent: May 5, 1998

[54] DISC REPAIR SYSTEM

[76] Inventor: Michael J. Smithlin, 11 Stanton Cir., Boxford, Mass. 01921

[21] Appl. No.: 717,759

[22] Filed: Sep. 23, 1996

Related U.S. Application Data

[63] Continuation-in-part of Ser. No. 603,684, Feb. 20, 1996, abandoned, which is a continuation of Ser. No. 193,944, Feb. 9, 1994, abandoned.

[51] Int. Cl.$^6$ ............................................. B24B 1/00
[52] U.S. Cl. .................... 106/10; 106/3; 106/11; 451/63
[58] Field of Search .................. 106/3, 10, 11; 451/63

[56] References Cited

U.S. PATENT DOCUMENTS

| | | | |
|---|---|---|---|
| 2,812,263 | 11/1957 | Geen et al. | 106/10 |
| 5,334,335 | 8/1994 | Norville | 51/308 |
| 5,571,041 | 11/1996 | Leikam | 541/63 |

*Primary Examiner*—Melissa Bonner
*Attorney, Agent, or Firm*—Glenna Hendricks; Stephen Gates

[57] ABSTRACT

A composition and method are described for repairing surface defects in plastic objects, particularly laser-readable discs such as audio compact discs, video laser discs and CD-ROM discs. Using the composition and method, a surface defect in the disc is smoothed over and filled with a waxy material having a refractive index approximating that of the plastic substrate, thereby forming a repair which does not distract the laser and permits continued use of the disc.

6 Claims, No Drawings

DISC REPAIR SYSTEM

This application is a continuation-in-part of U.S. patent application Ser. No. 08/603,684, filed Feb. 20, 1996, now abandoned, which is a continuation of U.S. patent application Ser. No. 08/193,944, filed Feb. 9, 1994, now abandoned.

BACKGROUND OF THE INVENTION

The invention relates to a composition and method for repairing defects on the protective plastic surface of objects, including scratches or gouges, particularly on a laser-readable object such as an audio compact disc or computer memory disc.

Laser-readable discs store information through a series of laser-induced pits in a metallized layer of a disc. The pits are "read" by a laser and converted to a signal which is processed by a signal processor into the music, video or text which was encoded by the pits. The metallized layer on which the information is stored typically is coated with a translucent or transparent protective plastic layer. When this protective layer becomes scratched or gouged, the laser may no longer be able to read the information in the affected section, and the signal may be interrupted or distracted. Depending on the seriousness of the defect, the disc may no longer be usable.

It is an object of the present invention to provide a composition and method uniquely suited to repairing surface defects such as scratches or gouges in laser-readable plastic discs by making the scratches or gouges optically invisible to the laser beam by smoothing any sharp edges and leaving an optically neutral residue to fill the scratches or gouges.

SUMMARY OF THE INVENTION

The invention is a composition useful for repairing defects, particularly post-manufacturing defects, on the protective plastic surface of an object and a method for repairing the protective surface of an object using the composition. Using the present composition and method, a scratch or gouge on the protective surface of the object is smoothed and filled in a single step. The composition and method are particularly useful for repairing surface scratches, gouges or other defects on laser-readable objects, such as audio compact discs, video laser discs or computer memory (CD ROM) discs by smoothing any sharp edges and leaving an optically neutral residue to fill the scratches or gouges.

The composition is substantially water-free and comprises a mixture of a wax having a refractive index compatible with the refractive index of the plastic, a liquid hydrocarbon-containing vehicle, a dispersant and an abrasive material. The abrasive material acts to smooth the edges of the scratch, gouge or other defect and the composition simultaneously fills the scratch, gouge or defect with a material having approximately the same refractive index as the plastic. The liquid hydrocarbon-containing vehicle is present to dissolve or disperse the wax, and the dispersant is present to keep the abrasive in suspension, thereby forming a uniform, easily applied material. The use of water or vehicles containing water should be avoided since formulating or mixing the composition with water causes its components to separate and become useless for the practice of the invention.

The method of the invention involves applying a substantially water-free composition which contains a mixture of a wax, a liquid hydrocarbon-containing vehicle, a dispersant, and an abrasive material to a scratch, gouge or other defect in a plastic object such that the edges of the defect are smoothed out and the defect is filled with the composition. As a result, a laser can read through the defect without disruption in reading the information encoded on the disc.

DETAILED DESCRIPTION OF THE INVENTION

A preferred aspect of the present invention provides a composition and method for repairing surface defects in laser-readable discs. The composition and method are designed to smooth the edges of the defect and fill the defect with a material having a refractive index compatible with the refractive index of the plastic material from which the disc is formed. Use of the present composition and method results in a smooth repair which does not distract the reading laser.

To accomplish this, the composition of the invention comprises a substantially water-free mixture of a wax material selected to have a refractive index at room temperature (about 25° C.) compatible with the refractive index of the plastic material which forms the disc, a liquid hydrocarbon-containing vehicle for dissolving or dispersing the wax, a mildly abrasive material for smoothing the edges of the defect, and a dispersant for suspending the abrasive material in the composition. These ingredients are mixed together to form a liquid or paste which can be applied easily to the disc, for example, with a cloth or other applicator. The presence of significant amounts of water in the composition should be avoided, because water causes the mixture to separate and become useless.

The wax can be any natural or synthetic wax which has a refractive index which is the same as or closely approximates the refractive index of the disc material. Most audio compact discs, computer memory discs (CD-ROM) and video laser discs are formed from polycarbonate, which has a refractive index at 25° C. of about 1.586. Therefore, to repair a defect in a polycarbonate disc, a wax having a refractive index between 1.4 and 1.6 can be used. Waxes having a refractive index in this range include carnauba wax (1.455), polyethylene wax (1.51) or polypropylene wax (1.49), for example. A mixture of waxes also may be used. Such waxes are readily available from a number of sources, for example, from Reed Wax, Reading, MA. The amount of wax in the formula should be sufficient to fill the scratch or defect, and which forms a stable mixture, i.e., does not separate from the formula upon standing. Generally, an amount in the range of from about 10 to 15% by volume based on the total volume of the material is effective for this purpose.

Any liquid hydrocarbon or hydrocarbon-containing material can be used as a vehicle provided it is substantially free of water, does not dissolve the disc material and is compatible with the wax used. Since the composition is designed to be applied by individuals, nontoxic vehicles are preferred. Liquid hydrocarbons which can be used for this purpose include, for example, mineral spirits, naphtha, kerosene, hydrotreated petroleum distillates such as naphthenic fractions and the like. Modified hydrocarbons such as Stoddard solvent may also be used as a vehicle. Hydrotreated hydrocarbon fractions of moderate or low volatility are preferred because of their mild odor. Hydrotreated petroleum distillates having an initial boiling point above 200° C. are particularly preferred. Such liquid hydrocarbons are readily available from a number of sources, for example from Exxon Corporation. The amount of vehicle in the formula should be sufficient to dissolve or disperse the wax, and form a stable paste or liquid. If the vehicle contains water, the ingredients separate or clump together and a stable dispersion cannot be obtained. Generally, an amount of vehicle in the range of form about 30% to about 60% by volume is effective for this purpose.

The dispersant can be any surface active material which will aid in forming a stable dispersion or suspension of the abrasive particles in the formula. Fatty acid salts, such as calcium stearate or calcium oleate, are particularly useful for this purpose. Such materials are readily available from a number of sources, for example, from Witco Corporation. The amount of dispersant should be sufficient to form a stable dispersion or suspension. Generally, an amount of dispersant in the range of from about 1% to about 10% by volume is effective for this purpose.

The abrasive material can be any abrasive compound which can polish the plastic surface without damaging it. Abrasive typically used in the glass polishing art, especially those used for polishing plastic lenses are particularly useful for this purpose. The abrasive particles preferably are less than 2 microns in diameter, and are round in shape. Platelet shaped particles can be used, but are less desirable. The amount of abrasive material used in the formula depends upon the type and morphology of the abrasive particles. For example, if the abrasive consists of large (e.g., 1–2 microns or greater) particles and/or platelet shaped particles, then less abrasive should be used. If the abrasive material consists of fine (e.g., less than 1 micron) particles and/or round particles, then more should be used. A preferred abrasive material is aluminum oxide particles having a particle size of about 0.75 microns and a round shape. Such particles are commercially available, for example, from Micro Abrasives Corporation. Generally, the amount of abrasive material in the formula preferably is in the range of from about 10% to about 50% by volume.

In the course of developing the composition of the invention it was found that introduction of water as an ingredient caused the constituents to separate and stable uniform compositions could not be prepared. Results were similar when water-containing alcohols were used.

The composition of the invention is prepared by combining the wax, vehicle, dispersant and abrasive material to form a paste or liquid. The ingredients can be mixed in any order. A preferred method of making the composition involves melting the wax, and blending vehicle and dispersant while gently heating, then blending the melted wax and vehicle mixture with agitation to form a smooth paste or liquid. The blend is allowed to cool, then is mixed with the abrasive material until a uniform dispersion is obtained.

A preferred formula for carrying out the present invention to repair polycarbonate discs comprises the following Formula I.

| FORMULA I | |
|---|---|
| Amount by volume | Ingredient |
| 11.00% | carnauba wax (yellow flake #1, Reed Wax) |
| 33.50% | Coastal Pale Oil 105 or Telura 323 (Exxon Corp.) |
| 5.50% | calcium stearate (Witco Corporation) |
| 50.00% | 0.75μ Al round particles (Microgrit PXA 411, Micro Abrasives Corp.) |
| 100.00% | |

The formula was made according to the following procedure: the wax, mineral spirits and dispersant were blended while gently heating to form a smooth paste; the paste was allowed to cool and was blended with the abrasive particles to form a uniform dispersion.

When cleanup of the equipment used to prepare the composition was attempted using water and a soap or detergent, the residual material in the equipment separated and agglomerated into an intractable mixture which was difficult to remove.

In another aspect, the present invention comprises a method of using the composition to repair defects or scratches in plastic objects. The method involves applying the composition to the surface to be treated and gently rubbing with a soft cloth or other applicator until the defect is smoothed and filled. The abrasive material polishes and smooths the edges of the defect forming a "beveled" edge, while the wax material fills the defect. The surface then is smoothed over and any excess material carefully removed. Alternatively, the composition first may be applied to a cloth or other applicator, and then applied to the surface to be treated. In a preferred form of the method of the invention the composition is rubbed in a radial direction, i.e., perpendicular to the direction of travel of the reading laser beam.

The following example describing the repair of laser-readable audio compact discs using the composition proves the efficacy of the composition and method. Several audio compact discs were provided which had been scratched with a sharp object to produce scratches and gouges on the surface thereof sufficient to cause skipping or interruption of the recording. Each disc was played on a compact disc player to confirm that the defect caused skipping or interruption of the sound. The scratches were examined under a stereoscopic microscope to visually note their severity. Each disc then was treated by applying a small amount of the composition of Formula I to the scratched area, and rubbing gently with a soft cloth. The progress of the repair was observed under a stereoscopic microscope. The disc was considered "repaired" when the edges of the scratch were beveled or rounded and the scratch itself filled in with the composition, which was verified visually under the microscope. Each disc was replayed on the same compact disc player. As a result of the treatment, each disc played without skipping or interruption in the repaired area.

I claim:

1. A composition for repairing a defect on the surface of a laser-readable object having a protective plastic surface, by smoothing the edges of the defect and filling the defect with the composition, the composition comprising a substantially water-free mixture of
    a wax capable of filling the defect and having a refractive index between about 1.4 and 1.6,
    a hydrotreated petroleum distillate,
    a dispersant, and
    an abrasive material comprising round particles having a particle size of about 2μ or less in diameter.

2. The composition of claim 1 wherein the hydrotreated petroleum distillate has an initial boiling point of at least 200° C.

3. A method of repairing a surface defect on surface of a laser-readable object having a protective plastic coating comprising the step of:
    applying to the defect a substantially water-free composition comprising a mixture of a wax having a refractive index between about 1.4 and 1.6, a hydrocarbon vehicle, a dispersant and an abrasive material;

the abrasive material smoothing rough edges of the defect and the composition filling the defect, thereby forming a smooth surface over the defect.

4. The method of claim 3 wherein the step comprises applying a substantially water-free composition comprising carnauba wax, a hydrocarbon vehicle, a fatty acid salt dispersant and an abrasive material comprising aluminum oxide.

5. The method of claim 3 wherein the protective plastic coating is a polycarbonate.

6. The method of claim 3 wherein the object comprises a compact disc, a laser video disc or a CD-ROM disc.

* * * * *